April 30, 1963

R. J. CURRAN 3,087,732

MAZE WITH A MECHANICAL MEMORY

Filed Feb. 15, 1962

INVENTOR.
ROBERT J. CURRAN
BY
Charles B. Cannon

HIS ATT'Y.

April 30, 1963  R. J. CURRAN  3,087,732
MAZE WITH A MECHANICAL MEMORY
Filed Feb. 15, 1962  4 Sheets-Sheet 2

INVENTOR.
ROBERT J. CURRAN
BY
Charles B. Cannon
His Att'y.

April 30, 1963  R. J. CURRAN  3,087,732
MAZE WITH A MECHANICAL MEMORY
Filed Feb. 15, 1962  4 Sheets-Sheet 3
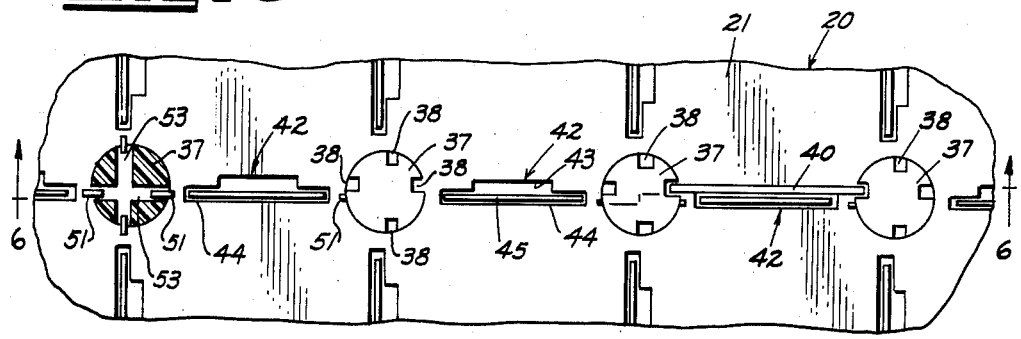
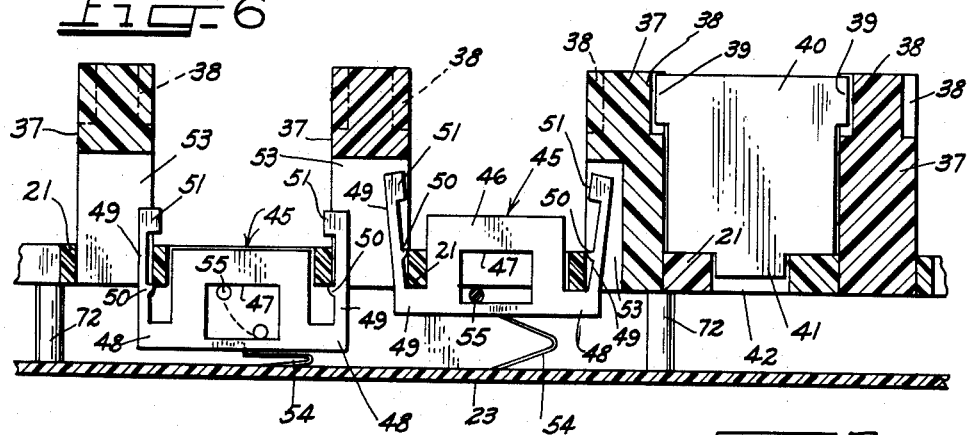
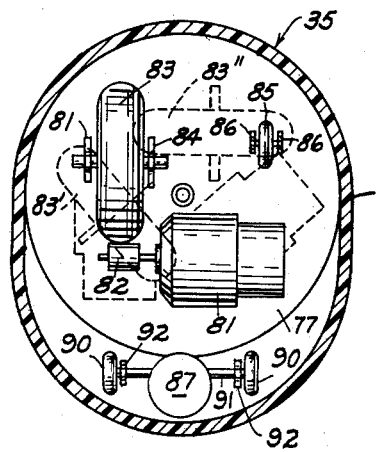
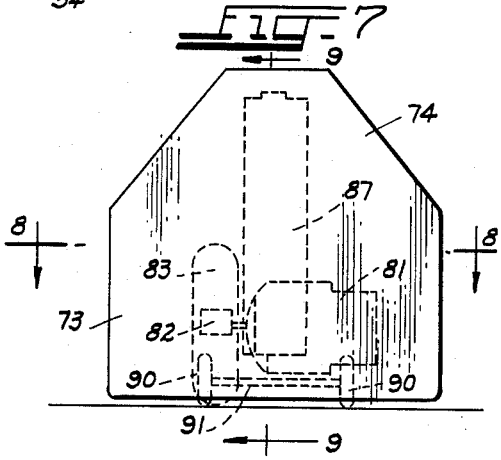
INVENTOR.
ROBERT J. CURRAN
BY
Charles D. Cannon
His Atty.

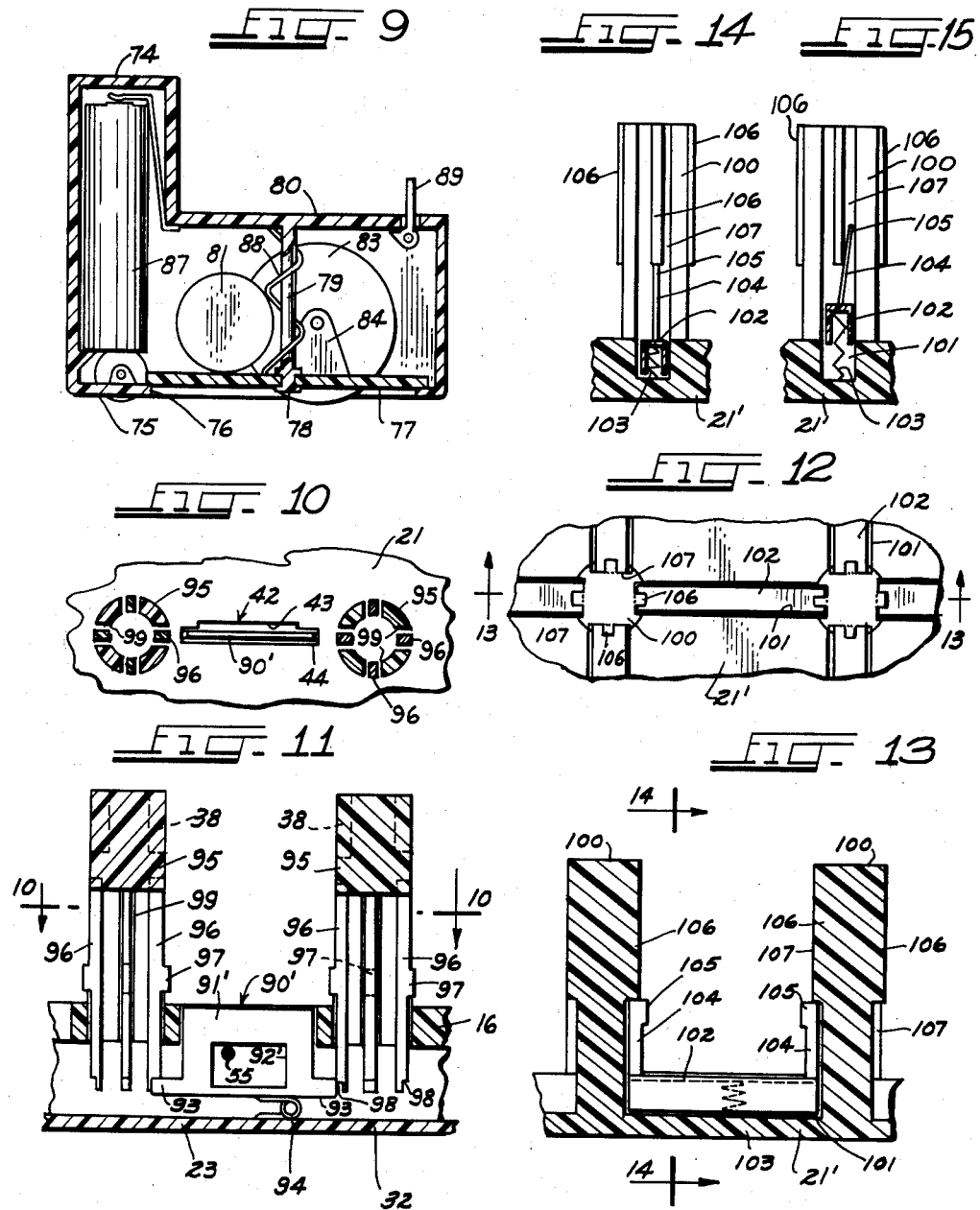

United States Patent Office 3,087,732
Patented Apr. 30, 1963

3,087,732
MAZE WITH A MECHANICAL MEMORY
Robert J. Curran, 558 Mitchell, Elmhurst, Ill.
Filed Feb. 15, 1962, Ser. No. 173,440
10 Claims. (Cl. 273—153)

This invention, in general, relates to educational or amusement devices and, more particularly, pertains to a maze apparatus wherein a mechanical body moves through the maze "blindly" on a first trial and with a "memory" on its next trial.

Almost everyone is familiar with the maze apparatus used in psychological studies of the ability of mice and other small animals to learn by experience to thread the maze. By experience through trial and error, the animal learns to avoid blind passages in the maze and to take only those passages which lead to the goal at the end of the maze.

This invention relates to a maze apparatus in which a mechanical body functions as the "mouse" and structural adaptations in the maze apparatus provide the "memory effect" so that the mechanical "mouse" in effect "learns" to thread the proper maze course after a first, blind, trial run. The apparatus is educational in illustrating mechanically memory signals which a live animal develops in its experience of learning the proper course through a maze. It is also a toy which may provide hours of relaxing amusement to children and even to adults in watching the mechanical "mouse" learn and in setting up an almost infinite variety of mazes.

It is a primary object of the invention to provide a maze apparatus of an educational and amusing character wherein a mechanical body "learns by experience" to thread the maze.

Another primary objective of the invention is that of providing a maze with retractable gates which are triggered by the mechanical body so that the retracted gates assume a blocking position with respect to the mechanical body in a manner to provide a "mechanical memory" for the mechanical body.

Another object of the invention is to provide novel, triggered, retractable gate mechanisms for amusement and/or educational devices.

Still another object of the invention is to provide a novel combination for setting retractable gate mechanisms in their retracted position.

Another object of the invention is to provide a maze board subdivided into sections by retractable gates and fixed, but removable wall sections.

Another object of the invention is to provide a maze board having elements which are activated by the return of a "mechanical mouse" from a blind passage on a first trip through the maze, which activated elements block off said blind passage against entry by said "mechanical mouse" upon a subsequent trip through said maze.

Other objects and advantages of the invention will be apparent from the description hereafter.

Briefly, the maze apparatus of the invention comprises a base divided by removable walls and retractable gates into a rectilinear arrangement of compartments. The walls and retractable gates of these compartments can provide many arrangements of at least one devious passage between the point of origin of the maze and the goal and a series of devious, blind passages branching off the first-mentioned passage.

The mechanical body travels through the maze on its first trial run with the gates all initially retracted out of contacting range with the mechanical body. When the mechanical body enters a blind passage, it turns about and retraces its path. The gates have an associated tripping mechanism operable by the mechanical body. This tripping mechanism releases the retracted gate in each instance where the mechanical body retraces its path so that the gate moves to a blocking position behind the mechanical body. These activated gates are the "memory signal" of the mechanical body, as will be apparent hereafter.

Eventually, after passing into and retracing out of several blind passages branching off the most direct, though devious passage between the point of origin and the goal, the mechanical body reaches the goal. It has, in its first trial run, tripped the tripping mechanisms of gates at the entrances of each blind passage into which it moved and then retreated.

The mechanical body is returned to starting position and begins to thread the maze once more. This time, however, it takes a direct path to the goal because the gates blocking the entrances to the blind passages prevent the mechanical body from entering the blind passages. Thus, the gates serve as the mechanical body's "memory" in preventing repetition of the same mistakes.

Further details of the invention, such as a mechanism for resetting the gates in retracted position, tripping mechanisms for the gates, details of construction of the mechanical body, etc., are set forth in the following further description of the invention together with the accompanying drawings, which, by way of illustration, show preferred embodiments of the invention and the principles thereof in which I consider to be the best mode contemplated for applying these principles. Other embodiments of the invention utilizing the same or equivalent principles may be used and structural changes may be made as desired by those skilled in the art without departing from the true spirit of the invention.

In the drawings:

FIG. 5 is an enlarged, plan, detail view of a fragment of the maze board of FIG. 1, showing the embodiment of FIG. 1 in greater detail.

FIG. 6 is a cross-sectional, detail view in side elevation, taken on section 6—6 of FIG. 5.

FIG. 7 is a front elevation of an embodiment of a mechanical body used to thread the maze of FIG. 1.

FIG. 8 is a plan view in cross-section on section 8—8 of FIG. 7.

FIG. 9 is a side elevation in cross-section on section 9—9 of FIG. 7.

FIGS. 10–15 are detail views of other embodiments, showing details of alternate constructions of posts on the maze board, retractable gates, and trippable locking mechanisms holding the gates in retracted position.

FIGS. 10 and 11 show a second embodiment in cross-section of a fragment of a maze board and posts thereon. FIG. 11 is a vertical section through a fragment of the maze board with the gate in retracted position while FIG. 10 is a cross-section taken on section 10—10 of FIG. 11.

FIGS. 12–15 show a third embodiment of the invention in which FIG. 12 is a top plan view of a fragment of a maze board.

FIG. 13 is a cross-sectional view taken on section 13—13 of FIG. 12.

FIG. 14 is a cross-sectional view taken on section 14—14 of FIG. 13 with the gate in retracted position.

FIG. 15 is a cross sectional view similar to FIG. 14 with the gate in raised position.

Figure 1:
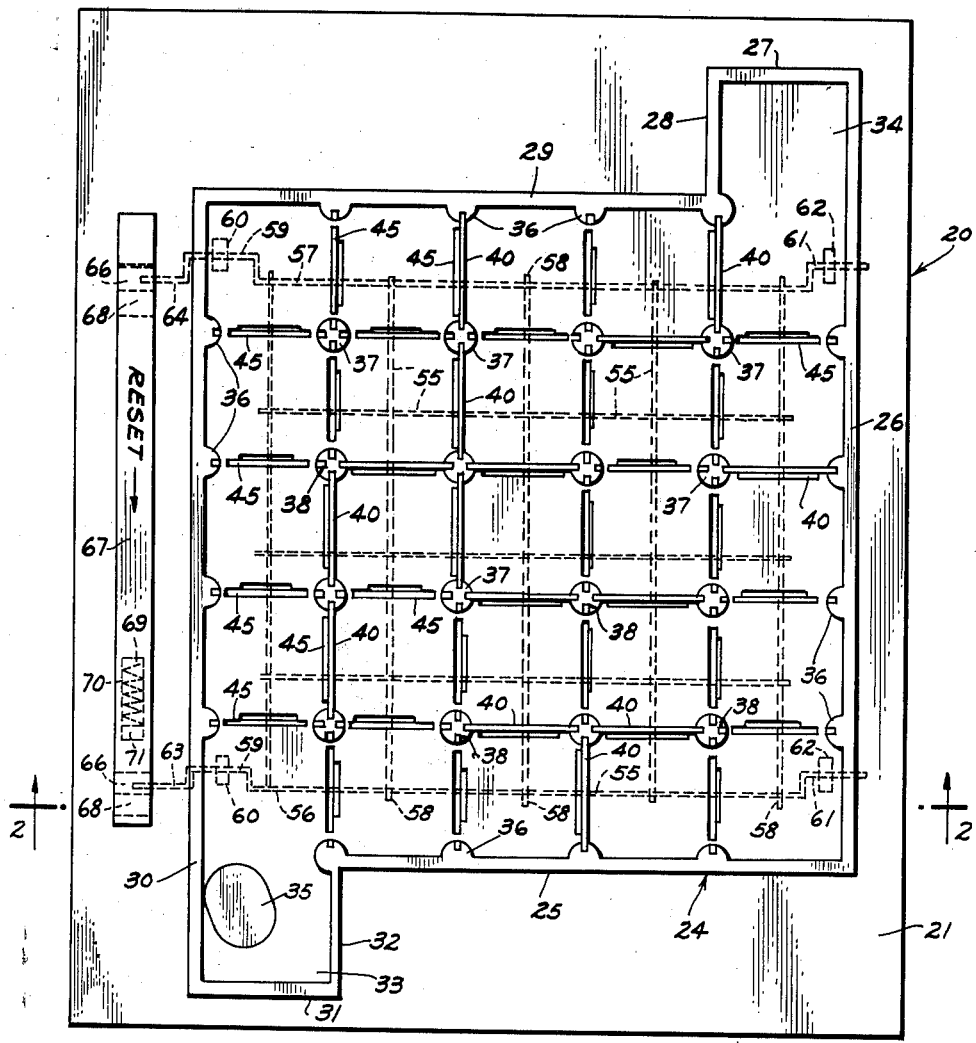
FIG. 1 is a top plan view of a maze board constituting a preferred embodiment, with certain minor features omitted for sake of clarity of the drawing.
Figure 2:
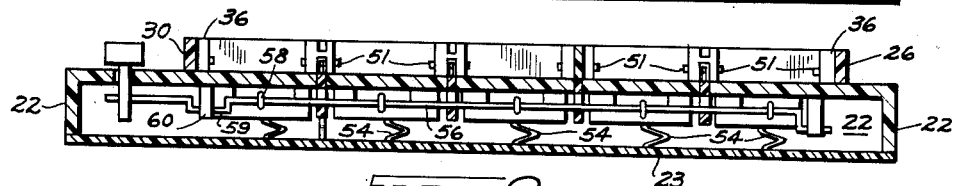
FIG. 2 is a cross-sectional side elevation of the maze board of FIG. 1, taken on section 2—2 of FIG. 1.
Figure 3:
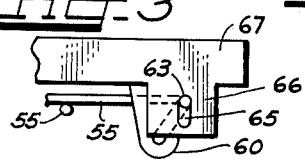
FIG. 3 is a fragmentary, detail view in side elevation of the linkage between the gate reset bar and the gate reset linkage.

Referring first to FIGS. 1–6, all of the components of the maze board are advantageously molded from a plastic with several minor exceptions hereinafter described. The invention, however, contemplates the manufacture of any one or more of these plastic parts from other materials such as metal, paperboard, wood and the like. The maze board 20 is made from molded plastic. It has an upper or top wall 21 and downwardly-extending side walls 22 forming a five-side enclosure. A bottom or lower wall 23 is secured about its edge to the lower edges of the side walls 22 by adhesive or other suitable means. The upper wall 21, side walls 22 and bottom wall 23 form a hollow, rectangular enclosure.

The boundary for the maze is defined by an upstanding, outer wall molded integrally with the upper wall 21 on the upper surface thereof. The outer wall 24 comprises wall sections 25, 26, 27, 28, 29, 30, 31, and 32. These sections form an open, wall-like enclosure of a generally square shape with small, square extensions 33 and 34 at opposite diagonal corners of the square. The extension 33 comprises the point of origin in which the mechanical body 35, i.e., a "mechanical mouse" is placed to originate the threading of the maze by said body. The extension 34 comprises the goal which the mechanical body must reach if it is to successfully thread the maze.

The walls 25, 26, 29 and 30 have rounded, semi-cylindrical projections spaced at equal intervals along the inner surface of said walls. These segments divide these walls into equal segments. The projections on opposite wall pairs, i.e., wall pairs 25 and 29 and wall pairs 26 and 30, are directly opposite each other.

The upper wall 21 has a series of holes therein at the points of intersection between lines drawn between opposite pairs of projections 36 on opposing wall pairs 25, 29 and 26, 30. Plastic pegs or studs 37 are inserted in these holes and form the corners of square subdivisions of the maze designated in FIG. 4 by the letters A through Y.

Each of the pegs or studs 37 has four upper slots 38 in the upper corners of the pegs. These upper slots 38 are slightly offset in opposite pairs from diameters dividing the cylinders into quadrants. The slots 38 are adapted to receive the side ears 39 of removable panel sections 40. The panel sections 40 have a lower ear 41 which is seated in the leg portion 43 of T-slits provided in the top wall 21 of the maze board between each peg or stud 37 and also between the pegs or studs 37 and the projections 36.

The cross leg 44 of each T-slit 42 accommodates retractable gates 45. The gates 45 are retractable to a position flush with or slightly below the surface of the top wall 21. The retractable gate in the retracted position is shown at the left hand side of FIG. 6. A gate in the raised position is shown in the middle of FIG. 6.

The retractable gates 45 comprise gate panel 46 having a rectangular opening 47 therein. The lower portions of the gate panels 46 have outwardly-directed side arms 48. Vertical latch or trigger arms 49 extend upwardly from each side arm into offset cross slits 53 in the lower portions of the pegs or studs 37. The vertical latch arms 49 have inwardly-directed projections 50 serving as latches which catch the under surface of the top wall 21 adjacent the holes in which the pegs or studs 37 are inserted. The vertical latch arms 49 also carry at their upper ends inwardly-directed projections 51 serving as trigger or contact elements which cause the latch arms to shift outwardly when contacted by the mechanical body passing through the maze. The gates 45 are biased toward the raised position by gate springs 54, which in the embodiment of FIGS. 1–6 are leaf springs having their tips mounted in the lower edge of the gate panels 46 and the bottom wall 23.

Figure 4:
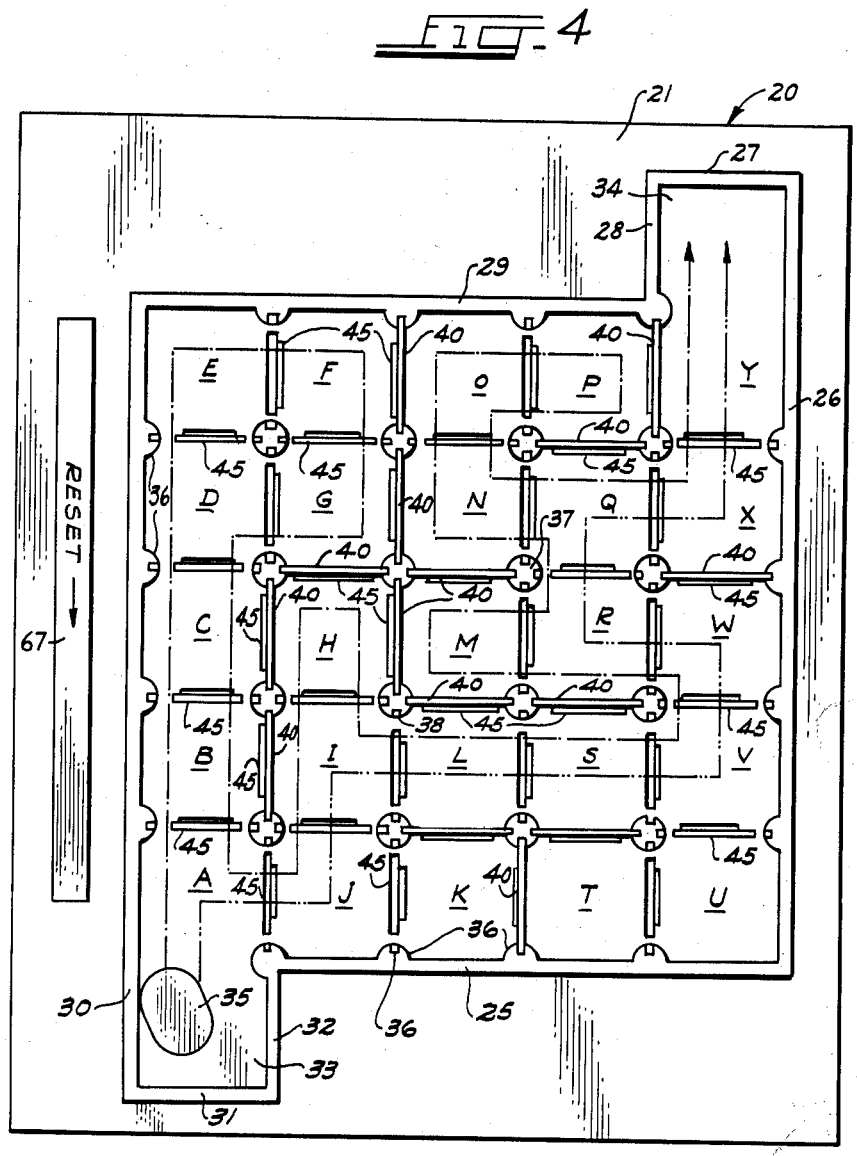
FIG. 4 is a top plan view of the maze board of FIG. 1 and shows the paths taken by the mechanical body in its initial threading of the maze and a subsequent threading of said maze.

Thus, in the preferred embodiment of the invention, there is a retractable gate 45 extending across the space between each adjacent peg or stud 37 and between adjacent pegs 37 and projections 36, the gates and pegs dividing the maze board into square subdivisions in a checkerboard pattern, which are designated by the letters A through Y in FIG. 4. The gate panels 45 may be made from a stamping or molding of thermoplastic resin. They may also be made of metal, if desired. In the embodiment shown, the gate panel 46, side arms 48 and latch arms 49 are made from a single piece of sheet material having a sufficient degree of resiliency so that the latch arms 49 are slightly springable outwardly when the mechanical body contacts its inwardly-directed contact or trigger elements 51. Each gate is latched in the retracted poistion by a pair of latch arms 49 with their respective latch elements 50 and contact or trigger elements 51. Therefore, to unlatch any gate, the mechanical body must contact both trigger elements 51 and release both latch elements 50 for any gate before it can raise with the urging of spring 54. In the apparatus illustrated, the contact elements 51 for any given gate are moved by the mechanical body at different times. The latch arms 49 are constructed in a manner so that the contact of only one latch arm contact element 51 will cause its respective latch 50 to be released with a very slight but sufficient raising of that side of the gate to allow the latch element 50 to become unseated from the underside of the upper wall 21. The gate, however, remains in retracted postion until the mechanical body contacts the other contact or trigger element 51 to release the gate and allow it to rise. This arrangement is conveniently accomplished by mounting the tip of the spring 54 at the center of the gate 45 and providing a slight clearance between the sides of the gate panel 46 and the cross legs 44 of the T-slits 42. In this combination, the gates can pivot slightly when one latch element 50 is released so that that side of the gate rises slightly and permits the latch element 50 to come to rest on the side wall of the hole in which the pegs or studs 37 are mounted. The bias of the springs 54 is a light bias which allows the gate to rise only after the mechanical body has passed thereover. Its bias must not be so strong that the release of the gate 45 will raise the mechanical body off the surface of the top wall 21 so that the mechanical body loses its traction.

The removable panel sections 40 are insertable in any desired pattern between the pegs or studs 37 or between the pegs 37 and the projections 36. The projections 36 are constructed in an identical manner to one-half of a peg or stud 37, including a slit corresponding to one of the slits 53 in the lower portion of the projection whereby the gates 45 between the projections 36 and the adjacent pegs 37 are of identical construction to those illustrated in FIGS. 5 and 6.

Each of the gates 45 may be pressed downwardly by hand to their retracted positions. It is preferred, however, to employ the simple reset mechanism shown in FIGS. 1 and 2, which reset mechanism comprises a square grid of rods or wires 55 which extend through the rectangular openings 47 in the gate panels 46. This grid of rods or wires is the means for the ganged resetting of all of the gates. The grid is moved up and down by a crank mechanism comprising crank arms 56, 57 at opposite sides of the grid. The ends 58 of the wires or rods 55 are round eyes through which extend the crank arms 56 and 57. These crank arms are rotatable in said eyes. The crank arm 56 has a crank portion 59 rotatably mounted in a plastic bearing 60 molded integrally with an extending downwardly from the top wall 21. The crank arm 56 also has another crank portion 61 rotatably journalled in a thermoplastic bearing 62 similarly provided on the under surface of the top wall 21. The crank arm 57 has identical crank portions 59 and 61 rotatably journalled in thermoplastic bearings 60 and 62.

The end portions 63, 64 of crank arms 56, 57 are mounted in a vertical slot 65 in a downwardly depending arm 66 on a reciprocable reset bar 67. The bar 67 reciprocably slides on the top wall 21 with the downwardly-depending arms 66 extending through slots 68 in the upper wall 21. The reset bar 67 has a rectangular recess 70 in the lower side thereof. A coil spring 69 is positioned in the recess 70 with one end of the coil spring bearing against an end wall of the recess 70 and the other end of the coil spring bearing against a vertical stud 71 projecting upwardly from the upper wall.

The reset bar 67 is pushed in the direction indicated by the arrow in FIG. 1 against the pressure of the coil spring 69, and causes the crank arms 56 and 57 to pivot. The pivoting of the crank arms 56 and 57 provides a parallel movement in the grid composed of the rods or wires 55, causing the entire grid to move downwardly. The wires or rods 55 press against the bottom of the rectangular openings 47 in the gate panel 46. This lowers all of the gates to a position where their latch elements 50 engage the undersurface of the wall 21. Upon release of the reset bar 67, the coil spring 69 returns the reset bar and the crank mechanism associated therewith to home position. The rods or wires return to their proper position in a path designated for the left-hand gate in FIG. 6. The gates, upon tripping of their associated tripping mechanism, can then rise to the position shown for the middle gate of FIG. 6.

The top wall 21 may have molded integrally therewith downwardly depending pillars 72 at spaced intervals to support the middle portions of the upper wall 21 on bottom wall 23.

The mechanical body may be of any suitable construction. An illustrative embodiment is shown in FIGS. 7-9 wherein the mechanical, mobile body 35 comprises a thermoplastic, hollow shell 73 of substantially oval cross-section in the lower segment thereof. The shell 73 has a tapered head segment 74. A bottom wall 75 is molded integrally with the other walls of shell 73. The bottom wall has a large, round opening 76 therein.

A round turntable 77 is seated over said opening with its outer edge slidably resting on the upper surface of bottom wall 75 adjacent said opening. The turntable 77 is rotatably journalled on fixed pivot bearing 78. The bearing 78 is on the lower end of a bearing-support post 79 which depends from the undersurface of the top wall 80 of the mechanical, mobile body 35.

On the turntable 77 is mounted a battery-operated electric motor 81. Motor 81 drives a friction-drive wheel 82 which, in turn, frictionally drives the large, power wheel 83 of the mechanical body. The power wheel is offset with respect to the center of the turntable for a purpose later described. The wheel 83 is rotatably journalled in journal supports 84 on the turntable 77 and extends through a slot (not shown) in the turntable.

A smaller support wheel 85 is mounted also on said turntable by journal supports 86. It forms the front wheel pair with power drive wheel 83. The remainder of the parts of the mechanical body 35 include a "pen-lite" dry cell 87 and an on-off switch 89. The wiring between the dry cell 87, switch 89 and motor 81 is not shown but is conventional.

The post 79 has a spiral spring 88 thereabout. The spring 88 has one end embedded in the top wall 80 and the other end embedded in the turntable 81. This spring is a bias to rotate the turntable in a counterclockwise direction, as viewed in FIG. 8. The mechanical body has a pair of small, rear wheels 90 mounted on an axle 91 rotatably journalled in journal supports 92 mounted on the bottom wall 75.

The mechanical body of FIGS. 7-9 operates on a left-hand bias as follows. Operation on a right-hand bias can also be employed in the invention, however, by simply reversing the direction of rotational bias of the spring 88 and also of the drive wheel 83 on the turntable 77. The turntable is mounted in a manner allowing it to pivot at least 45°, preferably at least about 90°, to both sides, of the position of the turntable 77 and wheel 83 shown in full lines in FIG. 8. When allowed to rotate freely under the bias of spring 88, the wheel 83 is in a position counterclockwise of straight-forward position (the full line position of FIG. 8). The former position is one in the order of the wheel position 83' shown in FIG. 8, preferably about 45° to 90° counterclockwise of the straight-forward position. The bias of spring 88 is sufficiently strong so that wheel 83 is pointed slightly left when power is applied to the drive wheel 83. The power on drive wheel 83 creates a torque on turntable 77 to rotate it in a clockwise direction, as viewed in FIG. 8. The counterbalancing, counterclockwise bias of spring 88 on the turntable is of sufficient moment so that the turntable and drive wheel are in a position slightly counterclockwise of the straight-forward position, as viewed in FIG. 8.

Under these conditions, the mechanical body travels through the maze—always bearing against the left-hand wall of any passage. When it reaches a right-hand corner such as the outer wall corner of cell E of FIG. 4, its forward movement is stopped. Because of the torque of power wheel 83 on the turntable 77, the turntable 77 rotates in a clockwise direction, as viewed in FIG. 8, toward the wheel position 83". At approximately position 83", the mechanical body pivots about an axis approximately between rear wheels 90, and the mechanical, mobile body begins to move along wall 29. The original left-hand bias on turntable 77 and wheel 83 is restored by spring 88 as the resistance to forward movement in the right-hand corner is alleviated by the turning of the mechanical body.

When the mobile body 35 reaches a left-hand corner like the lower, left-hand corner of cell G of FIG. 4, there is no wall impeding the left-hand bias of the turntable and wheel. At this point, the mechanical body's left-hand bias causes the body to make a sharp left-hand turn until it contracts the right-hand wall of cell C of FIG. 4. The resistance of this wall to further turning restores the original left-hand bias, linear travel of the mechanical body until it reaches another left-hand or right-hand corner.

A layout exemplary of the innumerable possible layouts attainable with the maze board of this invention is illustrated in FIGS. 1 and 4. Referring particularly to FIG. 4, there is shown in dot-dash lines the path of the mechanical, mobile body 35 taken upon its first and second trips through the maze of FIGS. 1 and 4. In the first instance, with all gates retracted, the mechanical body having a left-hand bias moves from the cell of origin 33 along wall 30, tripping the left-hand trigger of each gate over which it passes and thereby unlatching the left-hand side of each gate. The mechanical body passes through cells A through G and, "finding" this to be a blind passage, returns through cells D, C, B and A. In the return passage, it trips the right-hand trigger of the gates between cells C and D, B and C, and A and B. Each gate rises after the mechanical body passes thereover under the urging of leaf spring 54. The mechanical "mouse" then passes through cells J, I, H, I, L, S, V, W, R, M, R, Q, N, O, P, O, N, Q, X, and Y in the sequence stated, whereupon it reaches the goal cell 34. In this passage it contacted both trigger elements of the gates between cell paths H and I, M and R, O and P, N and O and N and Q, each gate rising after the mechanical "mouse" passes thereover. These gates are symbolic of memory signals of a live mouse which learns that certain passages are blind passages to be avoided in seeking the most direct route through the maze from the point of origin to the goal.

On the second threading of the maze by the mechanical "mouse" 35, it takes the most direct route—avoiding the blind passages branching off the direct route as a result of the raising of the gates at the entrances of these blind passages during the initial, trial threading of the maze by the mechanical "mouse." This direct route is through the following cells in the order stated: A, J, I, L, S, V, W, R, Q, X and Y.

When the mechanical "mouse" has threaded the maze for the second time, the raised gates are restored to their retracted position by pushing the reset bar in the direction indicated by the arrow to move the grid of wires 55 downwardly and retract the gates in the manner previously indicated. The previously described threading of the maze can then be repeated with the same maze configuration, or the maze may be altered by changing the placement of some or all of the panel sections 40. In the event that the panels 40 are inserted to provide a maze pattern in which it is impossible for the mechanical "mouse" to reach the goal, the "mouse" would traverse the course and eventually return to the point of origin 33 where it will eventually become entrapped within the confines of the cell of origin 33 and cell A. Such entrapment is symbolic of the frustration of a live mouse presented with a course impossible to thread. If desired, a retractable gate identical to those gates heretofore illustrated may be installed between the cell of origin 33 and cell A. In such case, the "mouse" would return to the cell of origin 33 and refuse to leave when confronted by an impossible maze— the aforesaid gate rising upon the return of the "mouse" to the cell of origin 33.

It will be appreciated that a virtually unlimited number of maze configurations are possible in the practice of the invention herein taught. The solutions to the threading of these mazes are also virtually unlimited. While the apparatus has application as an amusement device or toy for children or adults, it also has an educational value in the demonstration of a mechanical memory and logic system symbolic of an animal memory and logic development through trial and error learning.

It is also within the contemplation of the invention to use the maze apparatus herein disclosed as a competitive game wherein two or more mechanical "mice" are placed in different cells on the maze board. These mechanical "mice" compete in a race to see which reaches the goal cell 34 first. In these circumstances, the mechanical "mice" should be sufficiently narrow so that they will pass each other while travelling in opposite directions in any of the cells.

To illustrate a game of this nature, there can be included with the maze board and a plural number of mechanical, mobile bodies, a pack of cards. Each card has a letter corresponding to the letter designation of the cells of the maze board. In the case of the embodiment illustrated in FIG. 4, there would be 25 cards bearing the letters A through Y. The game rules could provide that the contestant has the choice of direction of origin in which he places his mechanical body in the lettered cell corresponding to the card which he draws from the pack. As an alternative, the rules could provide that each "mouse" must be faced toward a given side of the maze board, e.g., toward the reset bar 67. A still further alternative would be to include as a part of the game apparatus a dial with a spinner in which the dial is divided into four quadrants corresponding to the four principal directions. The maze board in this instance, would be marked with words or symbols corresponding to the directions north, east, south and west. In this instance, the direction of origin of the contestant's "mouse" in his cell determined by a blind drawing from the pack of cards would be determined by the contestant's spinning of the spinner.

A game of this type could prove to be highly interesting and amusing because the trigger mechanisms for the gates are tripped by a plural number of "mice" running in various directions. There is a considerable likelihood that one "mouse" would contact one trigger mechanism of a gate in one of the blind alleys or passages and a second "mouse" would later enter the blind alley or passage and trip the other trigger mechanism for the gate, thereby closing the gate and shutting the "mouse" in the blind alley. Eventually, the tripped "mouse" would become confined within one of the cells in the blind alley or passage, thereby eliminating this "mouse" from the competition in attaining the goal. Eventually, one of the competing "mice" may reach the goal cell 34 and win the contest, although it is possible that all of the "mice" may become trapped in blind alleys during the game, which would then end in a tie.

Having thus described an exemplary embodiment of the invention, it will be apparent to those of skill in the art that the invention is susceptible of many modifications in the structure of the maze board, the structure of the mechanical, mobile body and in the educational and amusing uses of the maze board and mechanical bodies by the applications of the generic principles of the invention herein disclosed. FIGS. 10 through 15 illustrate alternative embodiments of the retractable gate structures which may be used in the maze board combination heretofore described in lieu of the gates 45 and their associated latch elements and trigger mechanisms.

The embodiment of FIGS. 10 and 11 comprises an alternative form of retractable gate structure which can be used in the maze board of FIGS. 1 through 6. Where applicable, like numerals have been used to designate like parts.

The gate structure of FIGS. 10 and 11 comprises a retractable gate 90' made from a gate panel 91' with a rectangular opening 92' therein. A rod 55 of the gate reset grid heretofore described extends through said rectangular opening. The gate panel 91' has at its lower end upwardly-extending ears 93 and is biased upwardly by a coil spring 94 having its end secured in the bottom edge of the gate panel 91' at the mid-point thereof and in the bottom wall 23.

The pegs or studs 95 in this alternative embodiment have offset slots 38 adapted to receive the ears of the panel sections 40 described in the embodiment of FIGS. 1 through 6. The lower ends of the pegs or studs 95 are hollow and contain four vertically-extending slots 99 at 90° intervals. Latch or trigger arms 96 are mounted in the slots 99 and extend downwardly through said slots. These latch or trigger arms 96 are springable inwardly toward the center of the pegs or studs 95. The arms 96 have a notched end 98 adapted to seat on the upper corner of the outwardly-extending arms 93 to hold the gate in retracted position. When the protruding contact elements 97 are contacted by the mechanical body, the arms 96 are pushed inwardly so that their notched ends 98 become unseated from the arms 93. The view in FIG. 11 shows the right-hand arm in the unseated or unlatched position and the left-hand arm in the latching position.

In principle, the retractable gate 90' of FIGS. 10 and 11 operates similarly to the gates in the embodiment of FIGS. 1 through 6. Reference is made to the previous description for further appreciation of a maze board utilizing the alternative embodiment of FIGS. 10 and 11.

The retractable gate structure in the embodiment of FIGS. 12 through 15 involves a somewhat different principle of construction in which the maze board 21' is provided with a plurality of elongated grooves 101 extending between the pegs or studs 100. An U-channel gate 102 is seated in each groove 101 and has a coil spring 103 biasing each gate towards a raised position. The gate 102 is held in retracted position by springable arms 104 extending upwardly from each side of the upper surface of the gate 102. The arms 104 have contact or trigger elements 105 adapted to be contacted by the mechanical body as it moves through the maze.

In this embodiment, the arms 104 are springable sidewardly. In their latching position, they rest against the undersurface of a rib 106. The rib 106 is situated in the center of each of the four longitudinally-extending slots 107 situated at 90° intervals in the sides of the pegs or studs 100. The latter slots serve as guide channels in which the ends of the gate 102 ride.

When the mechanical body contacts a contact element 105, the arm 104 is pushed to one side or the other, depending upon the direction of movement of the mechanical body, the rib 106, thereby allowing its side of the gate to rise. When both arms 104 are unlatched, the gate 102 moves upwardly in the slots 107 with the arm 104 sliding between the rib 106 and the side wall of the slot 107. The gate in retracted and raised positions, respectively, and the position of the arm 104 are shown in FIGS. 14 and 15.

The gates in the embodiment of FIGS. 12 through 15 are reset in their retracted position by manual operation. The pegs or studs 100 may be provided with means to hold removable panel sections similar to the panel sections 40, if desired. Removable panel sections are optional, in all embodiments of the invention, inasmuch as the retractable gates can be tripped by hand to bring them to a raised position and provide any desired maze pattern.

It will, thus, be seen from the foregoing description considered in conjunction with the accompanying drawings, that the present invention provides new and improved educational and/or amusement apparatus having novel features, advantages and characteristics and accomplishing its intended objectives, including those hereinbefore pointed out and others which are inherent in the invention.

I claim:

1. A maze device comprising a maze board having upstanding members forming a devious passage over said board and at least one blind passage branching off said devious passage, a retractible gate in said blind passage, latching means to hold said gate in a retracted position, means urging said gate to a position blocking said passage, and means contactable by a mechanical body travelling into and out of said blind passage to unlatch said latching means upon the return of said mechanical body from the blind end of said blind passage.

2. A maze device comprising a maze board having an upstanding peripheral wall, a plurality of retractible gates dividing the area of said maze board within the confines of said peripheral wall into a plurality of cells, upstanding wall means between a portion of said cells forming a devious passage through a portion of said cells across said maze board within the confines of said peripheral wall, said wall means also forming at least one blind passage branching off said devious passage, one of said gates being at the entrance to said blind passage from said devious passage, latching means to hold said gate in a retracted position, means urging said gate to a position blocking said passage, and means contractable by a mechanical body travelling into and out of said blind passage to unlatch said latching means upon the return of said mechanical body from the blind end of said blind passage into said devious passage.

3. A maze device comprising a maze board having an upstanding peripheral wall, a plurality of retractible gates dividing the area of said maze board within the confines of said peripheral wall into a plurality of cells, upstanding wall means between a portion of said cells forming a devious passage through a portion of said cells across said maze board within the confines of said peripheral wall, said wall means also forming at least one blind passage branching off said devious passage, one of said gates being at the entrance to said blind passage from said devious passage, said gates being slidable upwardly and downwardly in said maze board, the upper edges of said gates being approximately flush with the upper surface of said maze board when said gates are in said retracted position, a resilient arm on each end of each gate, latch means on said arm engageable with a fixed surface to hold said gates in retracted position, bias means urging said gates to a raised position, and contact means on each resilient arm adapted to be contacted by a mechanical body travelling through said maze and to move said resilient arm to a unlatching position of said latch means.

4. A maze device comprising a maze board having an upstanding peripheral wall, a plurality of retractible gates dividing the area of said maze board within the confines of said peripheral wall into a plurality of cells, upstanding wall means between a portion of said cells forming a devious passage through a portion of said cells across said maze board within the confines of said peripheral wall, said wall means also forming at least one blind passage branching off said devious passage, one of said gates being at the entrance to said blind passage from said devious passage, said gates being slidable upwardly and downwardly in said maze board, the upper edges of said gates being approximately flush with the upper surface of said maze board when said gates are in said retracted position, each gate comprising a gate panel, an opening in each panel, a grid of rods extending through said openings, means to move said grid downwardly to cause said rods to bear against the bottoms of said openings and move the raised gates to a retracted position and to restore said grid to its raised, normal position, latch means to hold each gate in retracted position, bias means urging said gates to a raised position, and contact means adapted to be contacted by a mechanical body travelling through said maze and to unlatch said latch means.

5. A maze device comprising a maze board having an upstanding peripheral wall, a plurality of upstanding pegs evenly distributed on said board within the confines of said wall, a plurality of panels extending between a portion of said pegs and also between a portion of said pegs and said wall to form a devious passage across said maze board and at least one blind passage branching off said devious passage, gates in said passages extending between said pegs and dividing said passages into a plurality of cells, said gates being retractible, means urging said gates to a position blocking said passage, latch means holding said gates in retracted position, and means activitated by a mechanical body travelling through said maze to unlatch said latch means when the mechanical body passes over said gates twice in opposite directions.

6. A maze device comprising a maze board having an upstanding peripheral wall, a plurality of upstanding pegs evenly distributed on said board within the confines of said wall, a plurality of panels extending between a portion of said pegs and also between a portion of said pegs and said wall to form a devious passage across said maze board and at least one blind passage branching off said devious passage, gates in said passages extending between said pegs and dividing said passages into a plurality of cells, said gates being retractible, means urging said gates to a position blocking said passage, latching members at each end of each gate adapted to latch the gate in retracted position, and trigger elements on each latching member extending into said passages and adapted to be contacted by a mechanical body travelling through said maze to unlatch its respective latching member and allow said gate to move to a position blocking said passage when both latching members of the gate are unlatched.

7. The combination of claim 6 wherein said latching members are outwardly springable upwardly-extending arms attached to said gate at each end thereof with inwardly extending latching members latchably-engageable with the bottom surface of said maze board, said pegs having vertical slots into which said upwardly-extending arms extend, and said trigger elements are projections on said arms extending outwardly from said slots into said passages.

8. The combination of claim 6 wherein said pegs having vertical slots in which are suspended said latching members, which members comprise springable arms attached at their upper ends to said pegs, outwardly extending arms on each end of said gates, the lower ends of said springable arms being latchably engageable with said outwardly extending arms to latch said gates in their retracted position, and said trigger elements are projections on said arms extending outwardly from said slots into said passages.

9. The combination of claim 6 wherein said pegs having opposing vertical slots in which said gates are vertically slidable into and out of said maze board between a retracted position and a raised position, said latching members are sidewardly springable arms on each end of said gates extending upwardly into said slots and having a segment extending into said passage constituting said trigger element, and an abutment in said slots narrower in width than the width of said slot, the upper ends of said springable arms being latchably engageable with said abutments when the gates are in the retracted position and being unlatched when said arms are moved sidewardly by a mechanical body travelling through said maze.

10. A maze device comprising a maze board divided into a plurality of cells by a plurality of gates vertically movable into and out of said maze board, means to latch said gates in the lower position, bias means urging said gates to a raised position, and means associated with said gates to unlatch said latching means for each gate when contacted by a mechanical body travelling over said maze board.

References Cited in the file of this patent

UNITED STATES PATENTS

| | | |
|---|---|---|
| 600,696 | Patterson | Mar. 15, 1898 |
| 2,563,608 | Laufer | Aug. 7, 1951 |
| 2,872,192 | Hamilton | Feb. 3, 1959 |